(12) United States Patent
Shukunami et al.

(10) Patent No.: US 7,899,296 B2
(45) Date of Patent: Mar. 1, 2011

(54) OPTICAL FIBER REEL

(75) Inventors: Norifumi Shukunami, Kawasaki (JP);
Kazunori Miura, Kawasaki (JP); Hiroki Horiuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 206 days.

(21) Appl. No.: 12/143,341

(22) Filed: Jun. 20, 2008

(65) Prior Publication Data
US 2008/0317426 A1 Dec. 25, 2008

(30) Foreign Application Priority Data
Jun. 21, 2007 (JP) ................. 2007-163392

(51) Int. Cl.
*G02B 6/00* (2006.01)
(52) U.S. Cl. ............ 385/135; 385/21; 385/122
(58) Field of Classification Search ......... 385/135, 385/32, 122; 259/333, 341.1
See application file for complete search history.

(56) References Cited

U.S. PATENT DOCUMENTS

| | | | | |
|---|---|---|---|---|
| 6,334,020 B1 * | 12/2001 | Fujimori et al. | | 385/134 |
| 6,788,870 B1 * | 9/2004 | Maxham et al. | | 385/135 |
| 6,978,072 B2 * | 12/2005 | Arima | | 385/135 |
| 7,239,783 B2 * | 7/2007 | Yamamoto et al. | | 385/123 |
| 7,308,182 B2 * | 12/2007 | McCaig | | 385/135 |
| 7,389,032 B2 * | 6/2008 | Oguma | | 385/136 |
| 7,400,812 B2 * | 7/2008 | Seifert | | 385/135 |
| 2004/0227032 A1 * | 11/2004 | Gregory | | 242/614 |
| 2007/0036506 A1 * | 2/2007 | Kewitsch | | 385/135 |
| 2008/0013909 A1 * | 1/2008 | Kostet et al. | | 385/135 |
| 2008/0063344 A1 * | 3/2008 | Suzuki et al. | | 385/114 |
| 2008/0239468 A1 * | 10/2008 | Hamada | | 359/333 |

FOREIGN PATENT DOCUMENTS

| | | |
|---|---|---|
| JP | 5-270741 | 10/1993 |
| JP | 2001-213573 | 8/2001 |
| JP | 2002-316773 | 10/2002 |

* cited by examiner

*Primary Examiner* — Rhonda S Peace
(74) *Attorney, Agent, or Firm* — Staas & Halsey LLP

(57) ABSTRACT

An optical fiber reel storing a plurality of optical fibers having an annular frame; a first reel portion provided around an radially outer peripheral surface of the annular frame and receiving at least one of the plurality of optical fibers wound up around the radially outer peripheral surface; and, a second reel portion provided radially inside the annular frame and housing at least one of the plurality of optical fiber therein.

41 Claims, 11 Drawing Sheets

PRIOR ART

PRIOR ART

PRIOR ART

OPTICAL FIBER REEL

The present application is related to and claims the benefit of foreign priority to Japanese application 2007-163392, filed on Jun. 21, 2007 in the Japan Patent Office, which is incorporated herein by reference in its entirety.

BACKGROUND OF THE INVENTION

1. Field of the Invention

The present invention relates to an optical module such as an optical amplifier or a transponder mounted in annular form and, more particularly, to a reel and method for mounting an optical fiber in annular form.

2. Description of the Related Art

For an optical module used in optical communication systems, such as an optical amplifier or an optical transponder, an optical fiber used in the module is mounted on an optical fiber reel in order to house the optical fiber in a space of a small volume, as described in Japanese Patent Laid-Open Publication No. 2001-213573, for example.

In an erbium (Er) doped fiber amplifier (EDFA), which is a kind of optical amplifier, an Er-doped optical fiber (EDF) is mounted on an optical fiber reel and disposed in the amplifier. The EDF has a length of several meters to several tens of meters and used for amplifying light in a wavelength band ranging from 1530 to 1565 nm (C-band) or in a wavelength band ranging from 1570 to 1605 nm (L-band).

FIGS. 8 and 9 are diagrams showing optical fiber reels. Referring FIG. 8, in an optical fiber reel 60, an optical fiber 62 is wound around an outer peripheral surface 64 of an annular frame 66. A flange 68a, 68b may be provided on the periphery of each or one of opposite ends of the annular frame 66, and the optical fiber 62 is wound up between the flanges 68a, 68b. Reels having the structure shown in FIG. 8 can be those that do not have any flange. Referring FIG. 9, in an optical fiber reel 70, an optical fiber 72 is housed in a form of an annular bundle in an annular container 74.

In some optical amplifiers, in order to realize good amplification characteristics and compensate for internal loss, a plurality of amplifying units is used. In such cases, since each of the amplifying units has an EDF, a plurality of EDFs corresponding to the plurality of amplifying units is mounted on one optical fiber reel.

FIGS. 10 and 11 are diagrams showing arrangements in which a plurality of EDFs is mounted on one optical fiber reel. FIG. 10 shows a sectional view of a reel having a structure of four winding-up-type (bobbin-type) reels, such as shown in FIG. 8, used for four amplifying units. FIG. 11 shows a sectional view of a reel having a structure of four container-housing-type reels, as shown in FIG. 9, used for four amplifying units.

As shown in FIG. 10, in the winding-up-type reel, partition flanges 2, 3, and 4 are provided to extend from an outer peripheral surface of the annular frame, between opposite ends of flanges 1. EDFs 5, 6, 7, and 8, which are respectively associated with the amplifying units, are wound up against the surface of the frame with some pressure around portions between the partition flanges 2, 3, and 4. If the reel is made of a metal, a thickness for each flange of 1 to 4 is 0.5 mm at least and width necessary for the wound-up portions between the flanges is 1.5 mm at least. The width of the reel is about 3 mm. Accordingly, the reel height corresponding to the four amplifying unit, which is also a width of the annular frame, is 8.5 mm at least. Such a height is disadvantageous for reducing a size of the optical amplifier.

On the other hand, in the case of the container-housing-type reel shown in FIG. 11, as each of the EDFs 5 to 8 is bundled and housed, there is no need to provide any partition in the container. However, mounting density of the EDFs 5 to 8 on the container-housing-type reel is lower than the winding-up-type reel and the sectional area of the container is increased. For example, since the mounting density is about 20% in ordinary cases, in order to house 100 EDFs having a diameter of 0.25 mm, a sectional area of 6×6 mm including the sectional area of a 0.5 mm container wall is required.

SUMMARY

An optical fiber reel storing a plurality of optical fibers having an annular frame; a first reel portion provided around an radially outer peripheral surface of the annular frame and receiving at least one of the plurality of optical fibers wound up around the radially outer peripheral surface; and, a second reel portion provided radially inside the annular frame and housing at least one of the plurality of optical fiber therein.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

DETAILED DESCRIPTION OF THE PREFERRED EMBODIMENTS

Figure 1:
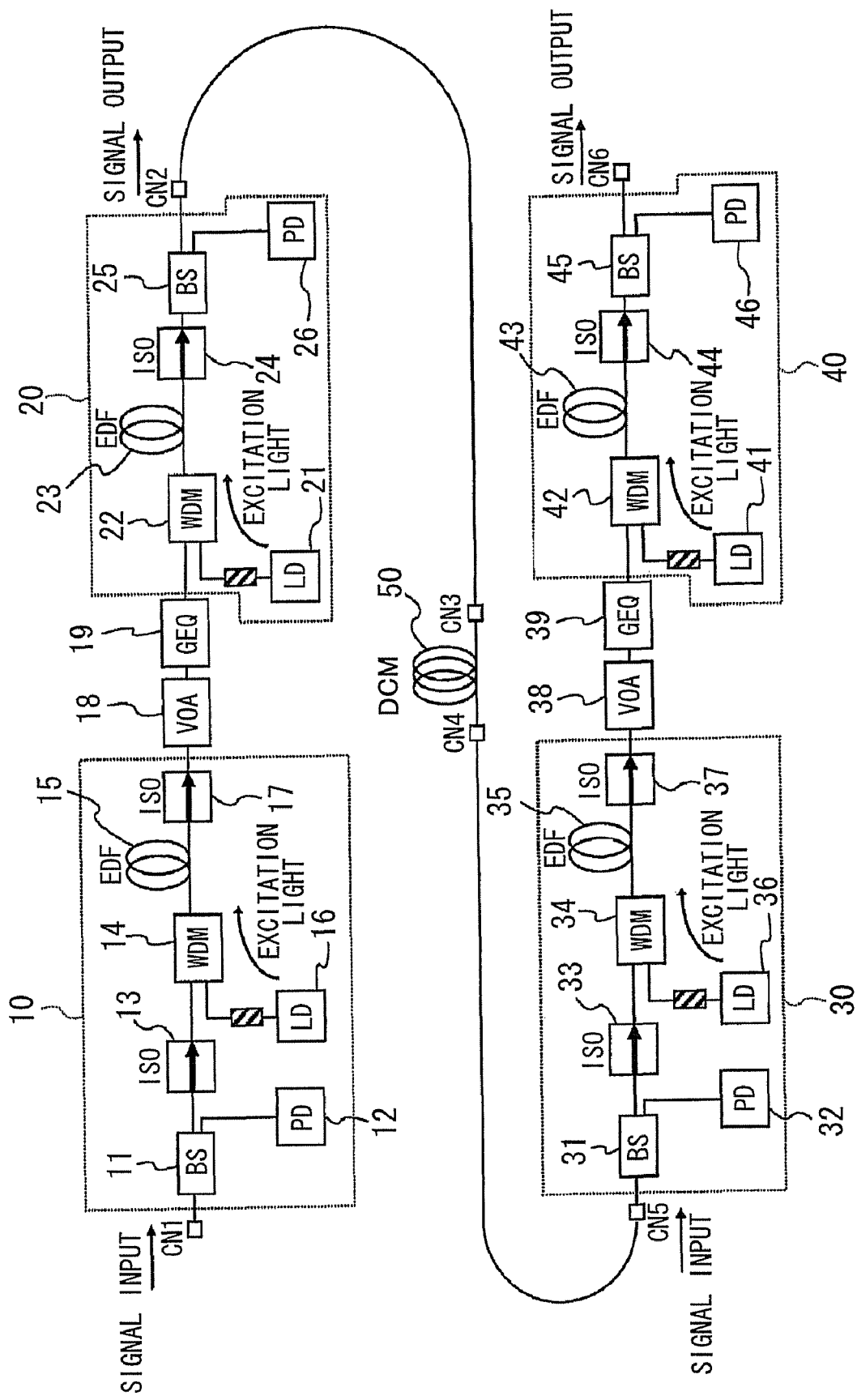
FIG. 1 is a block diagram of an optical amplifier using an optical fiber reel according to an embodiment.

Reference will now be made in detail to embodiments of the present invention, examples of which are illustrated in the accompanying drawings, wherein like reference numerals refer to like elements throughout.

FIG. 1 is a block diagram showing a configuration of a Wavelength Division Multiplexing (WDM) optical amplifier having four amplifying units using an optical fiber reel according to an embodiment. The WDM optical amplifier shown in FIG. 1 has a first amplifying unit 10 and a second amplifying unit 20 connected in series to each other and a third amplifying unit 30 and a fourth amplifying unit 40 connected in series to each other. A dispersion compensation module (DCM) 50 is provided between the second amplifying unit 20 and the third amplifying unit 30.

Signal light to be amplified is input to a branch coupler 11 in the first amplifying unit 10 through a connector CN1. In the branch coupler 11, part of the signal light is extracted, and supplied to a light receiving element 12, such as a photodiode, for monitoring. The remaining signal light propagates to an Er doped optical fiber (EDF) 15 provided as a light amplifying fiber via an optical isolator 13, which prevents light propagation in the reverse direction, and a WDM coupler 14. Excitation light from an excitation light source 16, such as a laser diode, is supplied to the EDF 15 through the WDM coupler 14, and the signal light propagating in the EDF 15 is amplified by stimulated emission from Er excited by the excitation light.

In the following description, EDF is used as a light amplifying fiber as a rare-earth-element-doped optical fiber. Various other rare-earth-element-doped optical fibers, such as a thulium doped optical fiber used for amplification in the band from 1480 to 1510 nm and a praseodymium doped optical fiber used for amplification in the band at 1300 nm, can be used. Additionally, while a forward excitation is described as an excitation method, backward excitation, bidirectional excitation and the like are also applicable.

The signal light amplified by the EDF 15 propagates through an output-side optical isolator 17 and is input to a variable optical attenuator (VOA) 18 and a gain equalizer (GEQ) 19 provided between the first amplifying unit 10 and the second amplifying unit 20, and thereafter propagates to the second amplifying unit 20. The variable optical attenuator 18 is used for gain control, and the gain equalizer 19 is used to equalize gain wavelength characteristics.

The signal light input to the second amplifying unit 20 propagates to an EDF 23 to which excitation light produced by an excitation light source 21 is supplied via a WDM coupler 22. The signal light is amplified in the EDF 23. The amplified signal light propagates through an optical isolator 24 and is input to a branch coupler 25. Part of the signal light is extracted at the branch coupler 25 to be supplied to a light receiving element 26 for monitoring.

The signal light output from the second amplifying unit 20 through a connector CN2 is input to the DCF 50 through a connector CN3 to undergo compensation for wavelength dispersion and is output from a connector CN4 to the third amplifying unit 30.

Part of the signal light input to the third amplifying unit 30 through a connector CN5 is extracted at a branch coupler 31 to be supplied to a light receiving element 32 for monitoring, and the remaining signal light propagates to an EDF 35 via an optical isolator 33 and the WDM coupler 34. Excitation light produced by an excitation light source 36 is supplied to the EDF 35 via a WDM coupler 34. The signal light amplified in the EDF 35 is output through an optical isolator 37 to be input to a variable optical attenuator 38 for gain control and a gain equalizer 39 for equalization of gain wavelength characteristics provided between the third amplifying unit 30 and the fourth amplifying unit 40.

The signal light input to the fourth amplifying unit 40 via the variable optical attenuator 38 and the gain equalizer 39 propagates to an EDF 43 to which excitation light produced by an excitation light source 41 is supplied via a WDM coupler 42. The signal light is amplified in the EDF 43. The amplified signal light propagates through an optical isolator 44 and is input to a branch coupler 45. Part of the signal light is extracted at the branch coupler 45 to be supplied to a light receiving element 46 for monitoring. The remaining signal light is output to an external optical transmission path or the like through a connector CN6.

Thus, in some cases where the WDM optical amplifier has the DCF 50 as an intermediate component, in order to compensate for a loss in the DCF, which may be about 15 dB, and amplify the signal light to a desired level, the WDM optical amplifier has two amplifying units before the DCF 50 and two amplifying units after the DCF 50. In such cases, the EDFs 15 and 23 in the first and second amplifying units 10 and 20, located at a former stage of the optical amplifier, may be excited by excitation light in a 980 nm band in order to reduce a noise figure (NF) and the EDFs 35 and 43 in the third and fourth amplifying units 30 and 40, located at a latter stage of the optical amplifier, may be excited by excitation light in a 1480 nm band in order to increase an output level.

Figure 2:
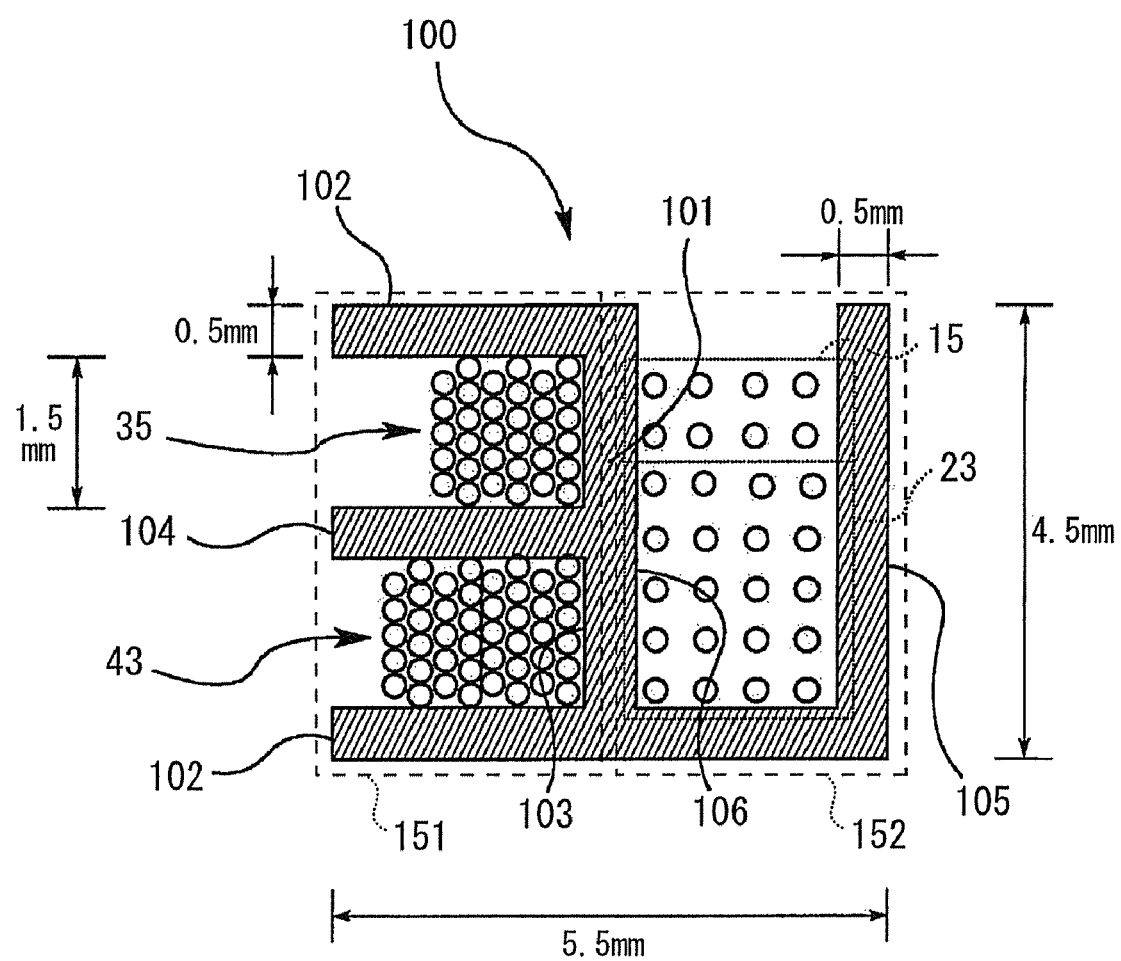
FIG. 2 is a sectional view of a portion of an optical fiber reel according to an embodiment.
Figure 3:
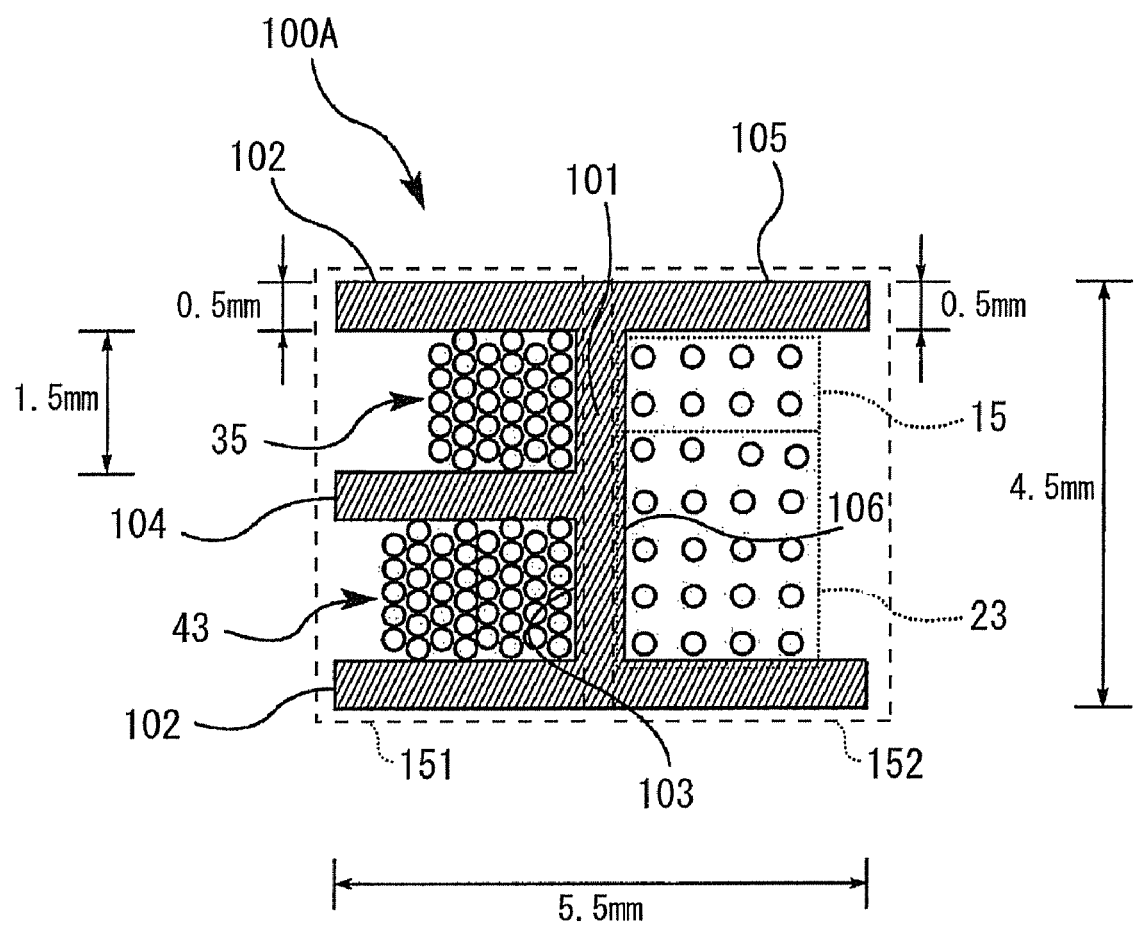
FIG. 3 is a sectional view of a portion of an optical fiber reel according to an embodiment.

FIGS. 2 and 3 are sectional views of portions of optical fiber reels on which each of EDFs 15, 23, 35, and 43 is mounted. The EDFs 15, 23, 35, and 43 correspond to the first to fourth amplifying units 10 to 40 in the WDM optical amplifier that have the above-described configuration.

As shown in FIG. 2, in an optical fiber reel 100, a first reel portion 151 includes flanges 102 that are provided on peripheries of opposite ends of an annular frame 101, and a partition flange 104 that is provided on the periphery of a central portion of an outer peripheral surface 103 located between the two flanges 102. In the first reel portion 151, the EDF 35 and the EDF 43 are respectively wound up around different portions of the outer peripheral surface 103, which is partitioned by the partition flange 104.

Figure 10:
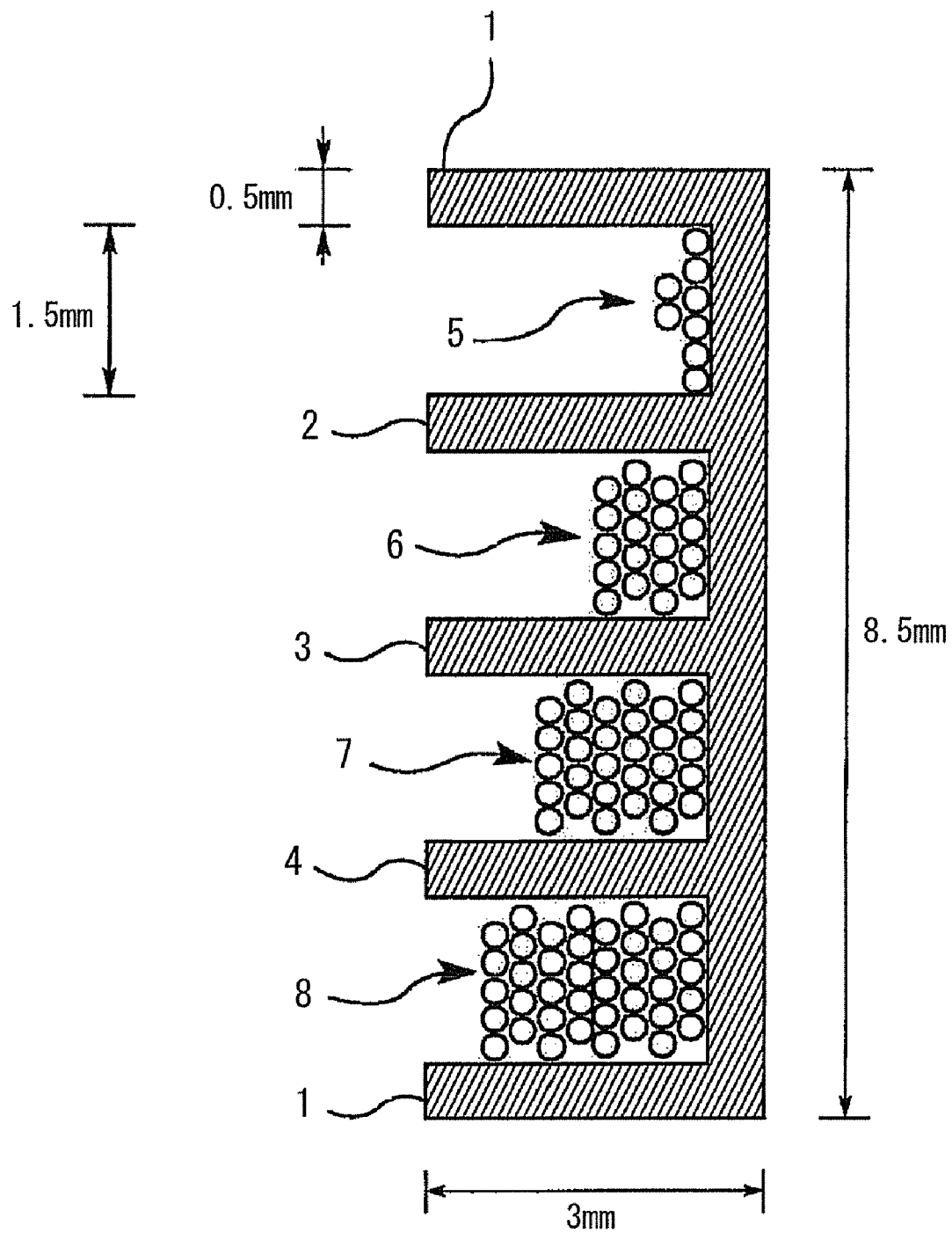
FIG. 10 is a sectional view of a portion of the structure of a conventional winding-up-type reel.

In that configuration, the first reel portion 151 realizes equivalent function to a winding-up-type reel, such as the one shown in FIG. 10 in the conventional art. Though the partition flange 104 in FIG. 2 is provided on a center of the outer peripheral surface 103, the partition flange 104 may be shifted depending on lengths of the optical fibers mounted on the opposite sides of the partition flange 104.

Also shown in FIG. 2, in the optical fiber reel 100, a second reel portion 152 inside the annular frame 101 includes a container portion 105 that opens at its top and is provided in annular form along an internal peripheral surface 106. In the second reel portion 152, each of the EDFs 15 and 23 is bundled in annular form and housed. In that configuration, the second reel portion 152 realizes equivalent function to a container-housing-type reel, such as the one shown in FIG. 11 in the related art.

The annular frame 101 may have any annular shape, as viewed from above, such as a circular shape, an elliptic shape, or a generally rectangular shape having each corner portion rounded by considering bending loss in the optical fiber.

Therefore, the optical fiber reel 100 in the present embodiment has a winding-up type first portion 151 outside the annular frame 101 and a container-housing type second portion inside the annular frame 101. In the reel 100, the EDFs 15 and 23, which are associated with the first and second amplifying units 10 and 20 forming one half of the four amplifying units, are housed in the container portion 105 corresponding to the second reel portion 152. On the other hand, in the reel 100, the EDFs 35 and 43, which are associated with the third and fourth amplifying units 30 and 40 forming the other half of the amplifying units, are wound up around the outer peripheral surface 103 corresponding to the first reel portion 151.

Therefore, the number of optical fibers wound up around the outer peripheral surface 103 in the optical fiber reel 100 in FIG. 2 is reduced to half compared to the number of optical fibers in the conventional optical fiber reel shown in FIG. 10, in which all the EDFs of 15, 23, 35, and 43, corresponding to all the amplifying units, are mounted on the winding-up-type reel. By reducing the number of partition flanges the reel height can be reduced (reduced from 8.5 mm to 4.5 mm in the illustrated example).

Figure 11:
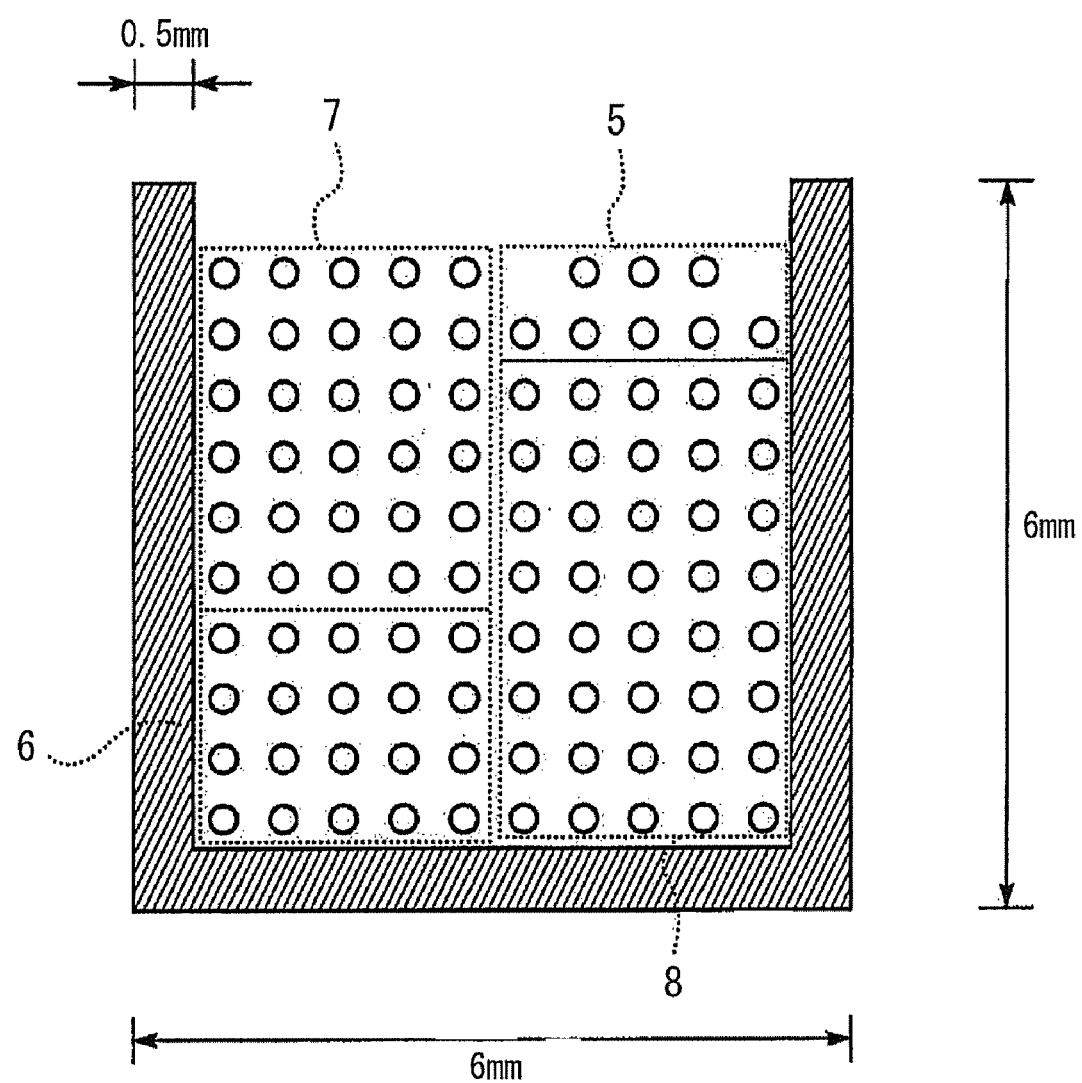
FIG. 11 is a sectional view of a portion of the structure of a container-housing type reel.

Additionally, the number of optical fibers housed in the container portion 105 in the optical fiber reel 100 in FIG. 2 is reduced by half compared to the conventional optical fiber reel shown in FIG. 11, in which all the EDFs 15, 23, 35, and 43, corresponding to all the amplifying units, are mounted in the container-housing-type reel. By reducing the number of optical fibers housed in the container portion 105, the container sectional area can be reduced.

Moreover, since the other half EDFs 35 and 43, which are not housed but are mounted by the winding-up method at a higher mounting density, the total mount space can be reduced, from 6×6 mm to 4.5×5.5 mm in the illustrated example. Thus, the optical fiber reel 100 is capable of mounting optical fibers with reduced space compared to the conventional optical fiber reel, and thereby can contribute to reducing optical amplifier size.

Referring to FIG. 3, in an optical fiber reel 100A, an opening of the container portion 105 is formed on the inside. That is, the opening is facing in a direction toward a center of the annular frame 101. Compared to the optical fiber reel 100 in FIG. 2, in which each of the EDFs 15 and 23 bundled in annular form is put in the container portion 105 from above, each EDF is inserted in the container portion 105 through an inside opening in the optical fiber reel 100A in FIG. 3. The reel 100A shown in FIG. 3 is also capable of mounting optical fibers with reduced space compared to the conventional optical fiber reel, from 6×6 mm to 4.5×5.5 mm, for example Moreover, positions and ways that EDFs are stored, i.e. housed or wound up, is related to positions that EDFs are located in an optical amplifier, i.e. former stage or latter stage. In the optical fiber reel 100 in FIG. 2 and the optical fiber reel 100A in FIG. 3, the EDFs 15 and 23, respectively associated with the first and second amplifying units 10 and 20, are housed in the container portion 105 at the inner position and the EDFs 35 and 43, respectively associated with the third and fourth amplifying units 30 and 40, are wound up around the outer peripheral surface 103 at the outer position.

This configuration is related to EDF length difference corresponding to excitation light wavelength. As described above, EDFs 15 and 23 and EDFs 35 and 43 differ in wavelength band of excitation light, which are associated with corresponding EDFs, and in fiber length.

In other words, comparatively longer optical fibers are mounted and wound up on the first reel portion formed at the outer position in the reel 100 and comparatively shorter optical fibers are mounted and housed on the second reel portion formed at the inner position in the optical fiber reel 100 in FIG. 2 or in the optical fiber reel 100A in FIG. 3.

The EDFs 15 and 23 are excited by excitation light in the 980 nm band and the EDFs 35 and 43 are excited by excitation light in the 1480 nm band. In general, a gain obtained by 980 nm band light excitation is higher than a gain obtained by 1480 nm band light excitation. Therefore, the EDFs 15 and 23 excited by the 980 nm band may be made shorter than the EDFs 35 and 43 excited in the 1480 nm band.

Therefore, by mounting and housing the shorter EDFs 15 and 23 at the inner position and mounting and winding up the longer EDFs 35 and 43 at the outer position, optical fibers can be mounted with improved space efficiency.

Moreover, in order to allow light in the 980 nm band to propagate through the EDFs 15 and 23, which are excited by the nm band light, the EDFs 15 and 23 have such a fiber structure that the cutoff wavelength is shifted to about 980 nm or shorter. Because of this structure, larger bending loss can occur in the EDFs 15 and 23, which are excited by the 980 nm band light, than in EDFs 35 and 43, which are excited by the 1480 nm band light. Reasons for this bending loss can be divided into macrobending and microbending. As microbending loss is caused by stress in a microregion, it is preferable to mount the EDFs 15 and 23, which are excited in the 980 nm band, in container-housing in order to suppress the bending loss.

Figure 4:
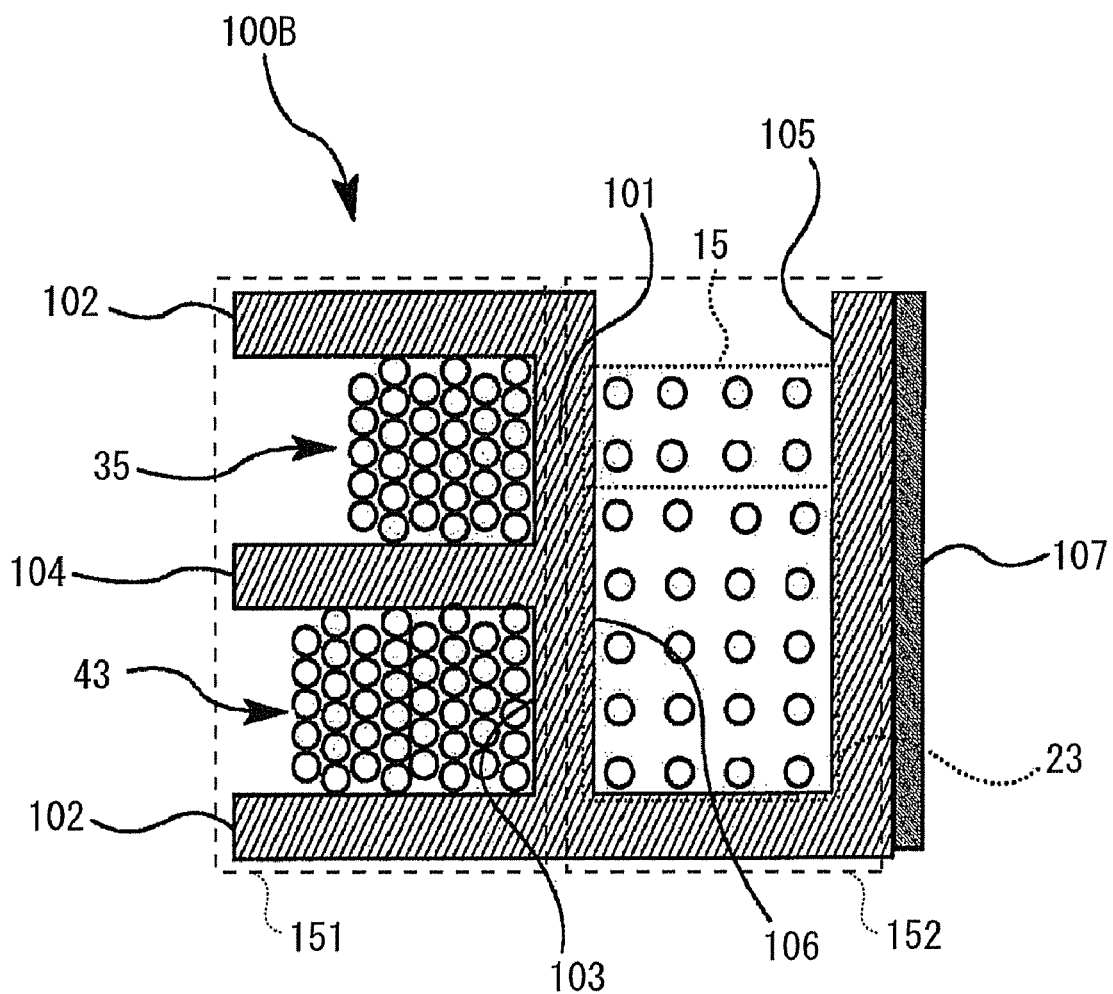
FIG. 4 is a sectional view of a portion of an optical fiber reel according to an embodiment.

Referring to FIG. 4, an optical fiber reel 100B has a same configuration as the optical fiber reel 100 shown in FIG. 2 with respect to the configuration of the first reel portion 151 and the second reel portion 152 and the EDFs 15, 23, 35, and 43 mounted on these reel portions. Referring to FIG. 4, a sheet-shaped heater 107 formed of a flexible circuit board is provided as a temperature control device on the inner peripheral surface of the container portion 105.

In some cases, it is preferable to set temperatures of operating EDFs as stable as possible, in order to reduce variation in gain wavelength characteristics that changes with temperature. Therefore, the heater 107 is set on the reel 100B to carry out temperature control, by being adhered to the inner peripheral surface of the container portion 105, for example.

The temperature control device provided on the reel is not limited to the heater. A Peltier module or the like may alternatively be provided as the temperature control device. The position at which the temperature control device is placed is not limited to the inner peripheral surface of the container portion 105.

As the optical fiber reel 100B in FIG. 4 has part of the fibers mounted by the winding-up method and not all the fibers are housed in the container portion 105, the optical fiber reel 100B is more advantageous in terms of heat conduction and carrying out the temperature control than the all-container-housing-type reel shown in FIG. 11.

Figure 5:
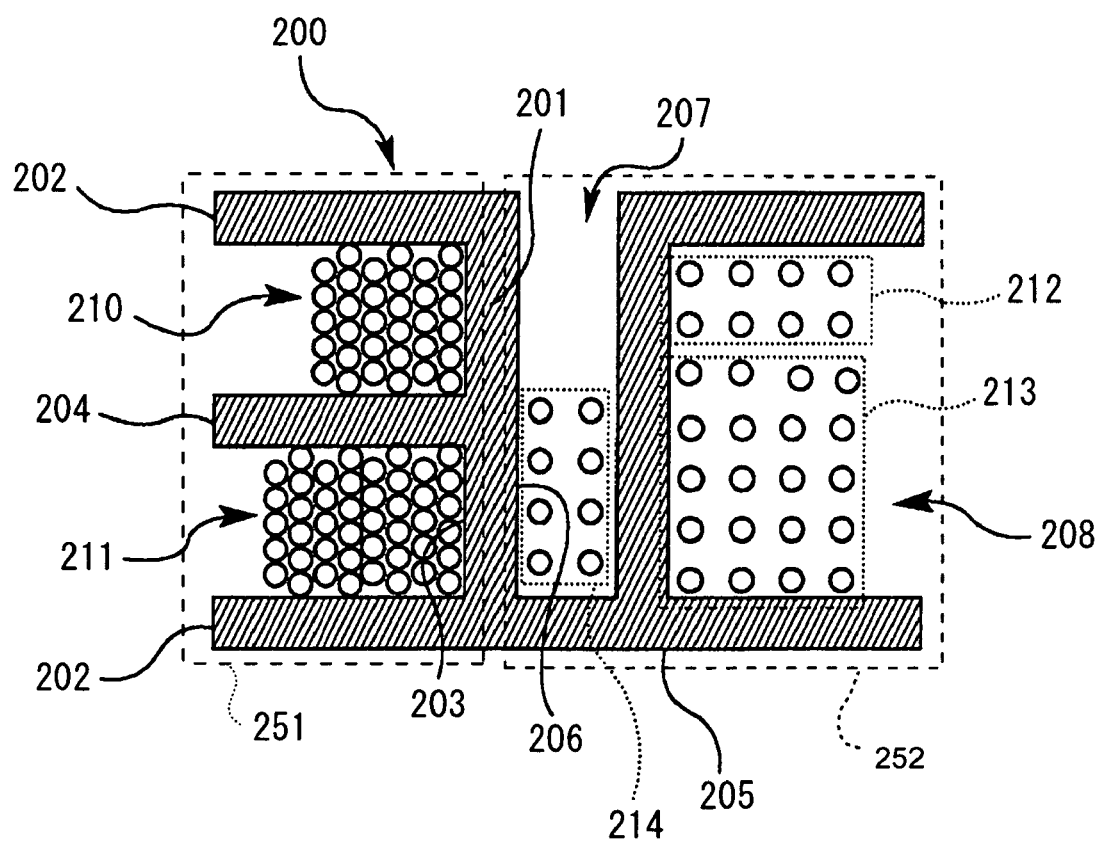
FIG. 5 is a sectional view of a portion of an optical fiber reel according to an embodiment.

Shown in FIG. 5 is an optical fiber reel 200 applicable to an optical amplifier having four or more amplifying units. In the optical fiber reel 200, a first reel portion 251 includes flanges 202 that are provided on the peripheries of opposite ends of an annular frame 201 and a partition flange 204 that is provided on a center of an outer peripheral surface 203 located between the flanges 202. Optical fibers 210 and 211, associated with amplifying units, the third and fourth amplifying units in FIG. 1, for example, are wound up around the outer peripheral surface 203 on the opposite sides of the partition flange 204.

Also in the optical fiber reel 200, a second reel portion 252 includes a container portion 205 formed in annular form along an inner peripheral surface 206 of the annular frame 201.

The container portion 205 includes two housings: a first container portion 207, that is formed inside the annular frame 201 and opened at its top, and a second container portion 208, that is formed radially inward of the first container portion 207 and opened at the radially inner peripheral side. Optical fibers 212, 213, and 214, which are respectively associated with amplifying units, are respectively housed in these container portions. For example, EDFs 212 and 213 for the first and second amplifying units are housed in the second container portion 208, and an EDF 214 for the fifth amplifying unit is housed in the first container portion 207. That is, the container portion 205 is of such a configuration that container portions like those described above with reference to FIGS. 2 and 3 are formed.

Figure 6:
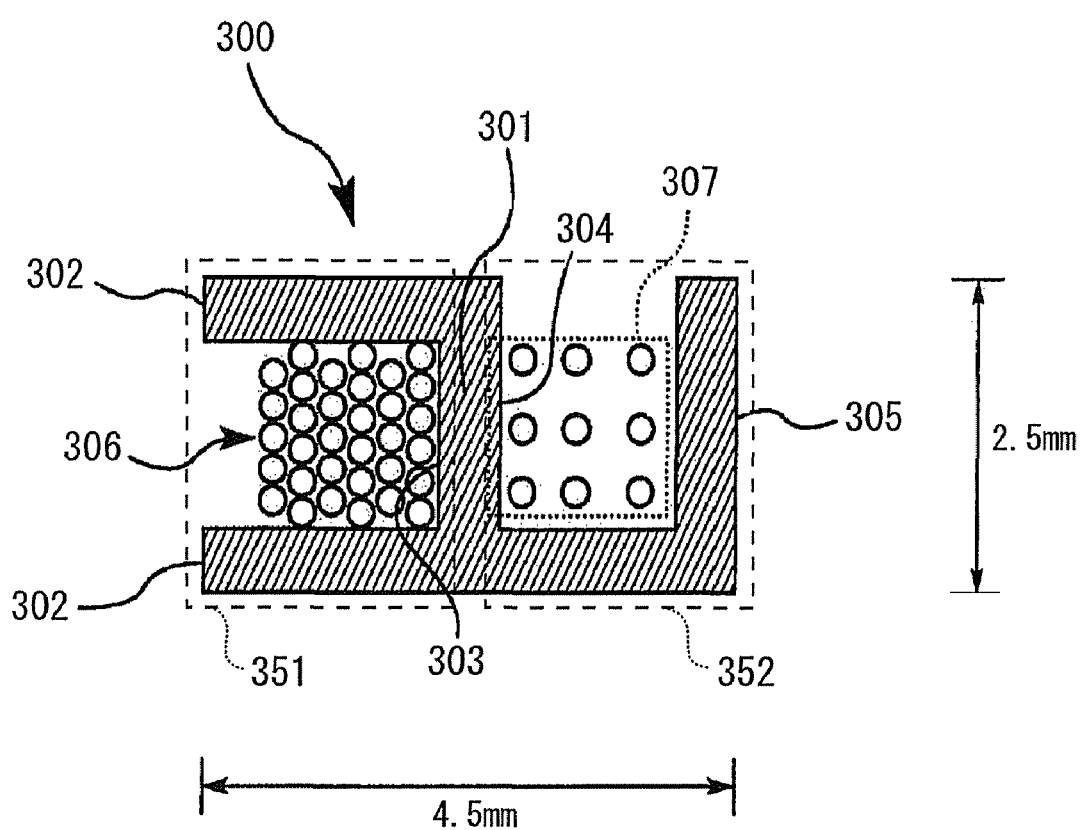
FIG. 6 is a sectional view of a portion of an optical fiber reel according to an embodiment.
Figure 7:
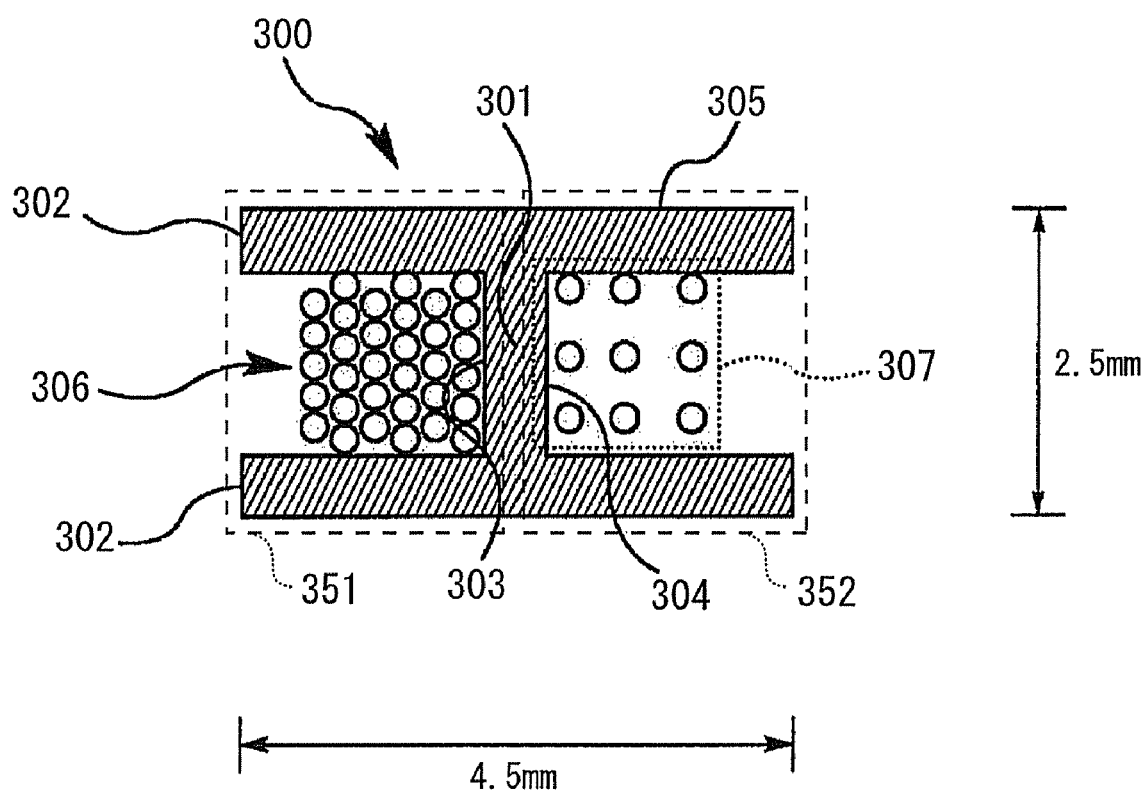
FIG. 7 is a sectional view of a portion of an optical fiber reel according to an embodiment.
Figure 8:
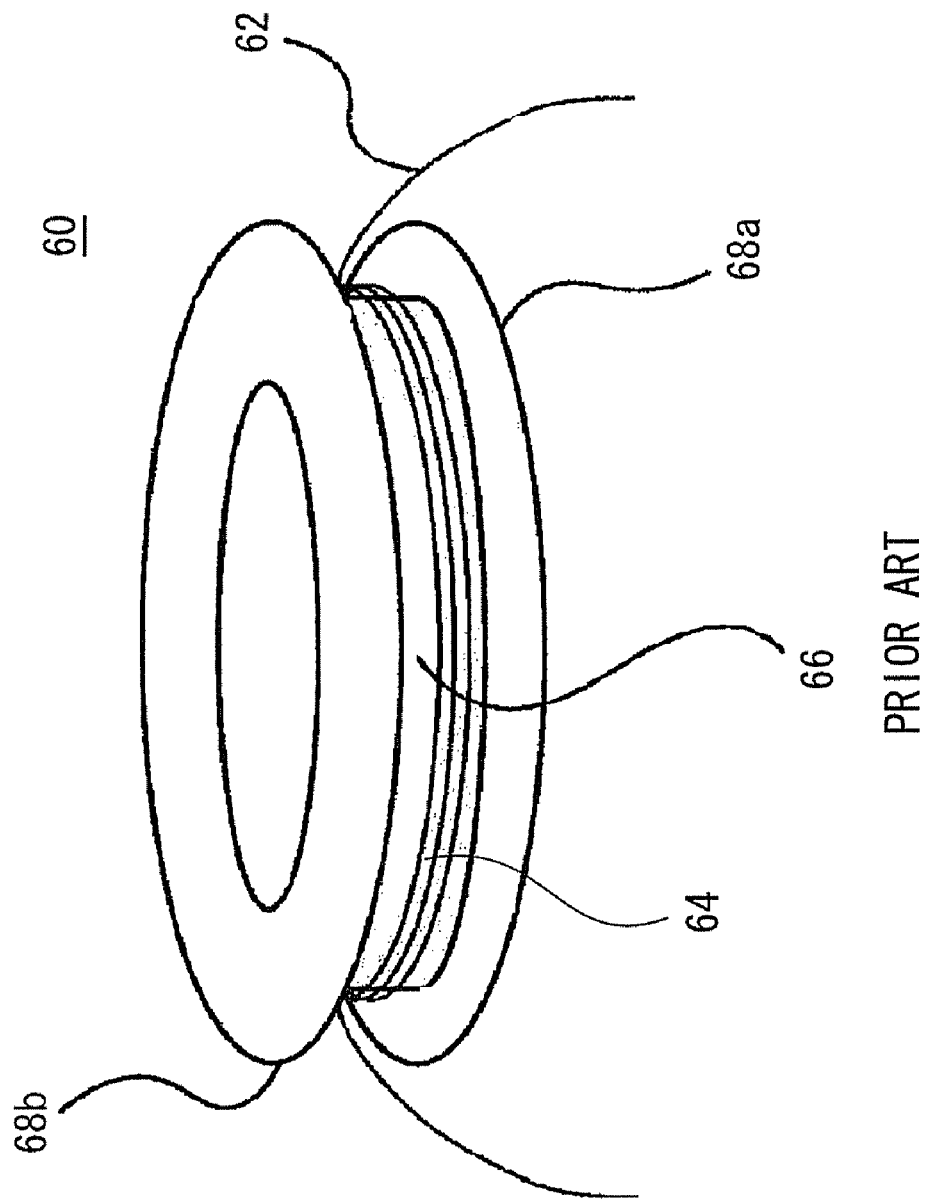
FIG. 8 is a perspective view of a conventional winding-up-type reel.
Figure 9:
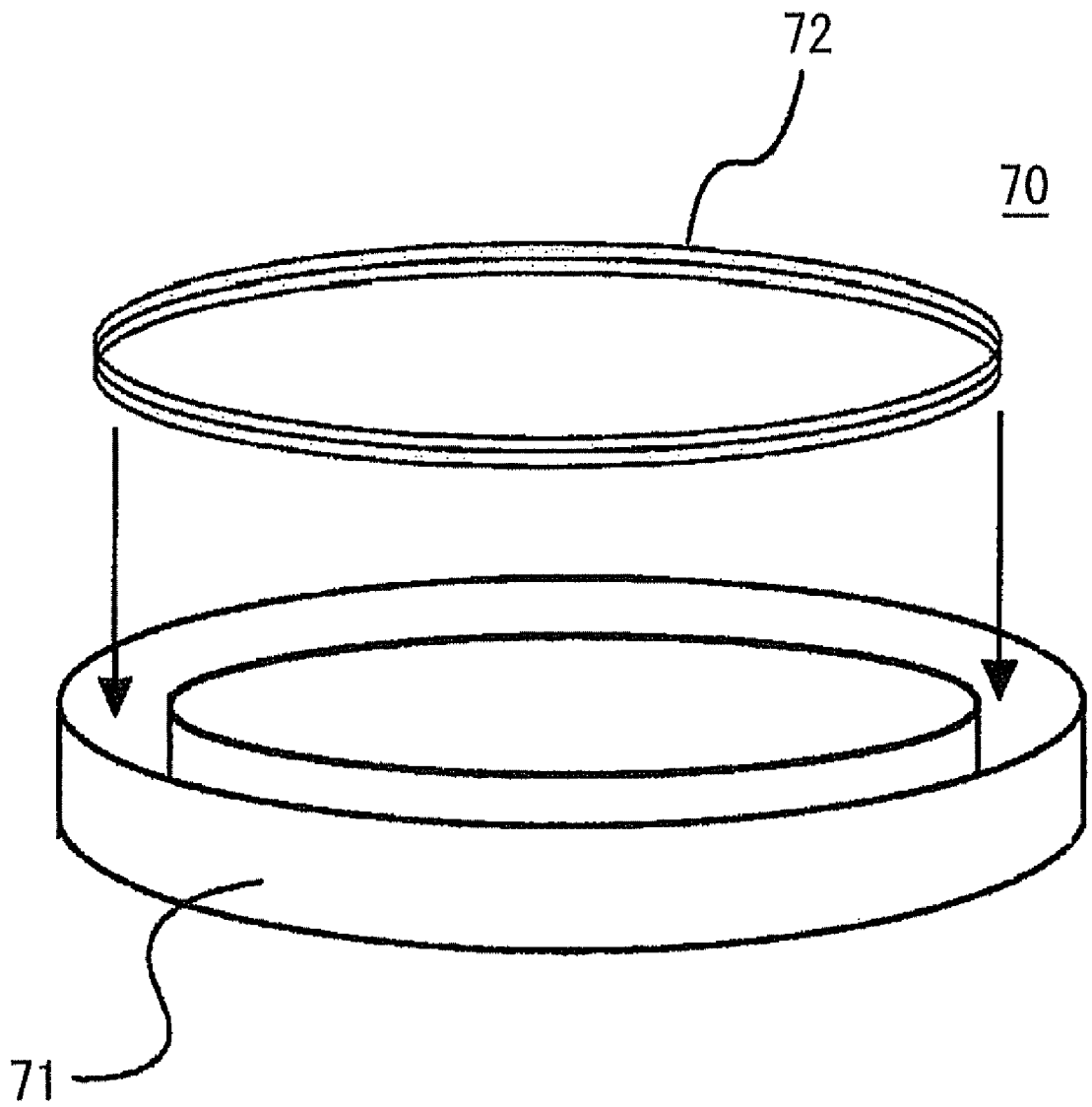
FIG. 9 is a perspective view of a conventional container-housing-type reel.

FIGS. 6 and 7 show simpler optical fiber reels for mounting two optical fibers. In an optical fiber reel 300 shown in FIG. 6, a first reel portion 351 includes an optical fiber wound up around a radially outer peripheral surface 303 located between flanges 302, which are provided on the peripheries of opposite ends of an annular frame 301. A second reel portion 352 has an optical fiber mounted in a container portion 305 provided in annular form along a radially inner peripheral surface 304 of the annular frame 301, and opened at its top. Also as described above, an optical fiber 307 mounted on the second reel portion 352 can be shorter than an optical fiber 306 mounted on the first reel portion 351. An optical fiber reel 300 shown in FIG. 7 has a container portion 305 opened at the inner peripheral side and is, except for this, the same as the optical fiber reel 300 shown in FIG. 6.

While the optical fiber reels that have flanges on the opposite ends of an annular frame are described above, the same function can be realized by an optical fiber reel that has a flange formed on only one end of an annular frame or even to a reel having no flange.

Additionally, while the optical fiber reels are used in an optical amplifier that has four amplifying units and a dispersion compensation module at an intermediate position in the description above, the optical fiber reels can also be applied to an optical amplifier having no dispersion compensation module, an optical amplifier having two or three amplifying units, and an optical amplifier having five or more amplifying units.

Additionally, while the optical fiber reels are used for optical amplifiers in which optical fibers are mounted in the description above, the optical fiber reels are also applicable to mounting of functional optical fibers, such as optical fiber filters having fiber Bragg grating, dispersion compensation modules, and fiber lasers, for example.

According to the above-described embodiments, a hybrid-type optical fiber reel that has a winding-up-type reel portion outside an annular frame and a container-housing-type reel portion inside the annular frame is provided. In this configuration, half of the optical fibers are mounted and wound up around a winding-up-type reel portion and another half of the optical fibers are mounted and housed in a container-housing-type reel portion, for example.

By this configuration, compared to a conventional optical fiber reel in which all optical fibers are wound up, the height of the optical fiber reel is reduced by reducing the number of optical fibers to be wound up by half, and thus reducing the number of partitions between the wound-up portion optical fibers.

Compared to the conventional optical fiber reel in which all optical fibers are mounted on a container-housing-type reel, the container sectional area and total mounting space are reduced by reducing the number of optical fibers to be housed by half and using higher winding-up mounting density for another half of the optical fibers.

In other words, by using two types of mounting, optical fiber reels of the embodiments are capable of mounting optical fibers within less overall space compared to an all-winding-up-type reel or an all-container-housing-type reel, and can therefore contribute to reductions in size of optical modules.

Although several embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical fiber reel storing a plurality of optical fibers, comprising:
    an annular frame;
    a temperature control device to actively control a temperature of the annular frame;
    a first reel portion provided around a radially outer peripheral surface of the annular frame and having a first opening extending in a radially outward first direction to receive at least one of the plurality of optical fibers wound up around the radially outer peripheral surface; and
    a second reel portion provided radially inside the annular frame and having a second opening extending in a second, different direction to receive an annular, first container housing at least another of the plurality of optical fibers therein.

2. The optical fiber reel according to claim 1, wherein the second, different direction is opposite the first direction.

3. The optical fiber reel according to claim 1, wherein a length of the at least another of the plurality of optical fibers in the second reel portion is shorter than a length of the at least one of the plurality of optical fibers in the first reel portion.

4. The optical fiber reel according to claim 3, wherein,
    the plurality of optical fibers are Er-doped optical fibers and used in an optical amplifier having a plurality of optical amplifying units and a dispersion compensation module,
    the at least one of the plurality of optical fibers in the first reel portion is used in an amplifying unit disposed after the dispersion compensation module, and
    the at least another of the plurality of optical fibers in the second reel portion is used in an amplifying unit disposed before the dispersion compensation module.

5. The optical fiber reel according to claim 1, wherein the temperature control device is provided on the annular frame.

6. The optical fiber reel according to claim 5, wherein the temperature control device is a heater.

7. The optical fiber reel according to claim 1, wherein the first reel portion has two opposite ends and flanges provided on each opposite end, and at least one partition flange between the flanges.

8. The optical fiber reel according to claim 1, wherein the second direction is perpendicular to the first direction and the second reel portion further comprises a third opening extending in a radially inward, third direction to receive a second container portion housing at least still another of the plurality of optical fibers therein.

9. The optical fiber reel according to claim 1, wherein the annular frame is only one of circular, elliptical or rounded-corner rectangular.

10. The optical fiber reel according to claim 1, wherein the second reel portion further comprises a third opening extending in a radially inward direction to receive still another of the at least one of the plurality of optical fibers.

11. A method of mounting a plurality of doped optical fibers, comprising:
    forming an annular frame with a radially outer peripheral surface;
    forming a first reel portion on the radially outer peripheral surface with a first opening in a radially outward direction to receive at least one of the plurality of optical fibers;
    forming a second reel portion radially inside the annular frame with a second opening extending in a second, different direction to receive an annular container housing at least another of the plurality of optical fibers therein;
    winding up the at least one of the plurality of optical fibers through the first opening and around the radially outer peripheral surface of the annular frame;

housing the another of the plurality of optical fibers in annular form in a container portion provided through the second opening and inside the second reel portion; and actively controlling a temperature of the annular frame.

12. The method of mounting optical fibers according to claim 11, further comprising selecting the length of the another of the plurality of optical fibers in the container portion to be shorter than the length of the at least one of the plurality of optical fibers in the first reel portion.

13. The method of mounting optical fibers according to claim 12, further comprising selecting the at least one of the plurality of optical fibers in the first reel portion as an Er-doped optical fiber excited by excitation light in a 1480 nm band, and
selecting the another of the plurality of optical fibers in the container portion as an Er-doped optical fiber excited by excitation light in a 980 nm band.

14. The method according to claim 11, further comprising selecting the annular frame to be only one of circular, elliptical or rounded-corner rectangular.

15. The method according to claim 11, further comprising forming a third opening in the second reel portion extending in a radially inward direction to receive still another of the at least one of the plurality of optical fibers.

16. An optical module, comprising:
an annular frame having an outer peripheral surface, a first radially outer opening and a second opening extending in a direction different than the first opening;
a first optical fiber wound up through the first opening and around the outer peripheral surface of the annular frame; and
a second optical fiber housed in an annular form in a container portion received in the second opening,
wherein a temperature of the annular frame is actively controlled by a temperature control device.

17. The optical module according to claim 16, wherein, a length of the second optical fiber is shorter than a length of the first optical fiber.

18. The optical module according to claim 17, wherein,
the first optical fiber is an Er-doped optical fiber excited by excitation light in a 1480 nm band, and
the second optical fiber is an Er-doped optical fiber excited by excitation light in a 980 nm band.

19. The optical module according to claim 16, wherein the annular frame is only one of circular, elliptical or rounded-corner rectangular.

20. The optical module according to claim 16, wherein the annular frame further comprises a third radially outer opening to receive a third optical fiber therein.

21. An optical fiber reel storing a plurality of optical fibers, comprising:
an annular frame;
a first reel portion provided around a radially outer peripheral surface of the annular frame and receiving at least one of the plurality of optical fibers wound up around the radially outer peripheral surface; and
a second reel portion provided radially inside the annular frame and housing at least one of the plurality of optical fibers therein,
wherein a length of the at least one optical fiber housed in the second reel portion is shorter than a length of the at least one optical fiber wound up on the first reel portion, and
wherein the plurality of optical fibers is Er-doped optical fibers and used in an optical amplifier having a plurality of optical amplifying units and a dispersion compensation module,
the at least one optical fiber wound up in the first reel portion is used in an amplifying unit disposed after the dispersion compensation module, and
the at least one optical fiber housed in the second reel portion is used in an amplifying unit disposed before the dispersion compensation module.

22. The optical fiber reel according to claim 21, wherein the at least one optical fiber wound up on the first reel portion is excited by excitation light in a 1480 nm band, and
wherein the at least one optical fiber housed in the second reel portion is excited by excitation light in a 980 nm band.

23. The optical fiber reel according to claim 21, wherein a temperature control device is provided on the annular frame.

24. The optical fiber reel according to claim 23, wherein the temperature control device is a heater.

25. The optical fiber reel according to claim 21, wherein
the first reel portion has two opposite ends and flanges provided on each opposite end, and at least one partition flange between the flanges.

26. The optical fiber reel according to claim 21, wherein the annular frame is only one of circular, elliptical or rounded-corner rectangular.

27. An optical fiber reel storing a plurality of optical fibers, comprising:
an annular frame;
a first reel portion provided around a radially outer peripheral surface of the annular frame and receiving at least one of the plurality of optical fibers wound up around the radially outer peripheral surface; and
a second reel portion provided radially inside the annular frame and housing at least one of the plurality of optical fiber therein,
wherein the second reel portion has a first container portion opened in a direction perpendicular to the radial direction and a second container portion provided radially inside the first container portion and opened radially inward.

28. The optical fiber reel according to claim 27, wherein the annular frame is only one of circular, elliptical or rounded-corner rectangular.

29. An optical fiber reel storing a plurality of optical fibers, comprising:
an annular frame;
a first reel portion provided around a radially outer peripheral surface of the annular frame and receiving at least one of the plurality of optical fibers wound up around the radially outer peripheral surface; and
a second reel portion provided radially inside the annular frame and housing at least one of the plurality of optical fiber therein, and
wherein the plurality of optical fibers is Er-doped optical fibers and used in an optical amplifier having a plurality of optical amplifying units and a dispersion compensation module,
the at least one optical fiber wound up in the first reel portion is used in an amplifying unit disposed after the dispersion compensation module, and
the at least one optical fiber housed in the second reel portion is used in an amplifying unit disposed before the dispersion compensation module.

30. The optical fiber reel according to claim 29, wherein the at least one optical fiber wound up on the first reel portion is excited by excitation light in a 1480 nm band, and
wherein the at least one optical fiber housed in the second reel portion is excited by excitation light in a 980 nm band.

31. The optical fiber reel according to claim 29, wherein a temperature control device is provided on the annular frame.

32. The optical fiber reel according to claim 31, wherein the temperature control device is a heater.

33. The optical fiber reel according to claim 29, wherein the first reel portion has two opposite ends and flanges provided on each opposite end, and at least one partition flange between the flanges.

34. The optical fiber reel according to claim 29, wherein the annular frame is only one of circular, elliptical or rounded-corner rectangular.

35. An optical fiber reel storing a plurality of optical fibers, comprising:
an annular frame;
a first reel portion provided around a radially outer peripheral surface of the annular frame and having a first opening extending in a radially outward first direction to receive at least one of the plurality of optical fibers wound up around the radially outer peripheral surface; and
a second reel portion provided radially inside the annular frame and having a second opening extending in a second, different direction to receive an annular, first container housing at least another of the plurality of optical fibers therein,
wherein a length of the at least another of the plurality of optical fibers in the second reel portion is shorter than a length of the at least one of the plurality of optical fibers in the first reel portion, and
wherein,
the plurality of optical fibers is Er-doped optical fibers,
the at least one of the plurality of optical fibers in the first reel portion is excited by excitation light in a 1480 nm band, and
the at least another of the plurality of optical fibers in the second reel portion is excited by excitation light in a 980 nm band.

36. An optical fiber reel storing a plurality of optical fibers, comprising:
an annular frame;
a first reel portion provided around a radially outer peripheral surface of the annular frame and having a first opening extending in a radially outward first direction to receive at least one of the plurality of optical fibers wound up around the radially outer peripheral surface; and
a second reel portion provided radially inside the annular frame and having a second opening extending in a second, different direction to receive an annular, first container housing at least another of the plurality of optical fibers therein,
wherein a length of the at least another of the plurality of optical fibers in the second reel portion is shorter than a length of the at least one of the plurality of optical fibers in the first reel portion, and
wherein,
the plurality of optical fibers are Er-doped optical fibers and used in an optical amplifier having a plurality of optical amplifying units and a dispersion compensation module,
the at least one of the plurality of optical fibers in the first reel portion is used in an amplifying unit disposed after the dispersion compensation module, and
the at least another of the plurality of optical fibers in the second reel portion is used in an amplifying unit disposed before the dispersion compensation module.

37. An optical fiber reel storing a plurality of optical fibers, comprising:
an annular frame;
a first reel portion provided around a radially outer peripheral surface of the annular frame and having a first opening extending in a radially outward first direction to receive at least one of the plurality of optical fibers wound up around the radially outer peripheral surface; and
a second reel portion provided radially inside the annular frame and having a second opening extending in a second, different direction to receive an annular, first container housing at least another of the plurality of optical fibers therein,
wherein the second direction is perpendicular to the first direction and the second reel portion further comprises a third opening extending in a radially inward, third direction to receive a second container portion housing at least still another of the plurality of optical fibers therein.

38. A method of mounting a plurality of optical fibers on an annular frame, comprising:
forming an annular frame with a radially outer peripheral surface;
forming a first reel portion on the radially outer peripheral surface with a first opening in a radially outward direction to receive at least one of the plurality of optical fibers;
forming a second reel portion radially inside the annular frame with a second opening extending in a second, different direction to receive an annular container housing at least another of the plurality of optical fibers therein;
winding up the at least one of the plurality of optical fibers through the first opening and around the radially outer peripheral surface of the annular frame; and
housing the another of the plurality of optical fibers in annular form in a container portion provided through the second opening and inside the second reel portion;
selecting the length of the another of the plurality of optical fibers in the container portion to be shorter than the length of the at least one of the plurality of optical fibers in the first reel portion;
selecting the at least one of the plurality of optical fibers in the first reel portion as an Er-doped optical fiber excited by excitation light in a 1480 nm band; and
selecting the another of the plurality of optical fibers in the container portion as an Er-doped optical fiber excited by excitation light in a 980 nm band.

39. An optical module, comprising:
an annular frame having an outer peripheral surface, a first radially outer opening and a second opening extending in a direction different than the first opening;
a first optical fiber wound up through the first opening and around the outer peripheral surface of the annular frame; and
a second optical fiber housed in an annular form in a container portion received in the second opening,
wherein, a length of the second optical fiber is shorter than a length of the first optical fiber, and
wherein,
the first optical fiber is an Er-doped optical fiber excited by excitation light in a 1480 nm band, and
the second optical fiber is an Er-doped optical fiber excited by excitation light in a 980 nm band.

40. An optical fiber reel storing a plurality of optical fibers, comprising:
an annular frame;

a first reel portion provided around a radially outer peripheral surface of the annular frame and having a first opening extending in a radially outward first direction to receive at least one of the plurality of optical fibers wound up around the radially outer peripheral surface; and a second reel portion provided radially inside the annular frame and having a second opening extending in a second, different direction to receive an annular, first container housing at least another of the plurality of optical fibers therein, wherein a temperature control device is provided on the annular frame, and wherein the temperature control device is a heater.

41. An optical fiber reel storing a plurality of optical fibers, comprising:

an annular frame;

a temperature control device to actively control a temperature of the annular frame;

a first reel potion provided around a radially outer peripheral surface of the annular frame and receiving at least one of the plurality of optical fibers wound up around the radially outer peripheral surface; and a second reel portion provided radially inside the annular frame and housing at least one of the plurality of optical fibers therein.

* * * * *

UNITED STATES PATENT AND TRADEMARK OFFICE
CERTIFICATE OF CORRECTION

PATENT NO. : 7,899,296 B2
APPLICATION NO. : 12/143341
DATED : March 1, 2011
INVENTOR(S) : Norifumi Shukunami et al.

Page 1 of 1

It is certified that error appears in the above-identified patent and that said Letters Patent is hereby corrected as shown below:

Column 8, Line 50 in Claim 11, after "of" delete "doped".

Signed and Sealed this
Third Day of May, 2011

David J. Kappos
*Director of the United States Patent and Trademark Office*